United States Patent Office 3,356,551
Patented Dec. 5, 1967

3,356,551
METHOD OF JOINING BODIES OF POLY-
TETRAFLUOROETHYLENE
Richard E. Glenn, Lutherville, and Edwin G. Hood, Baltimore, Md., assignors to Martin-Marietta Corporation, a corporation of Maryland
No Drawing. Filed Aug. 21, 1961, Ser. No. 132,572
6 Claims. (Cl. 156—49)

This invention relates to a method for hermetically sealing and bonding polytetrafluoroethylene material to itself; particularly, the present invention provides a method which is especially adaptable for splicing polytetrafluoroethylene insulated electrical conductors.

Polytetrafluoroethylene, commercially known as Teflon TFE, has come into wide use as an insulating material for electrical conductors, particularly where the so-called exotic environmental conditions are present. Some of the uses have been in satellites, missiles, and in underwater apparatus where operating conditions may vary from a near vacuum in space to undersea pressures in the order of 9000 p.s.i. and also encompass the heat and vibration conditions of rocket launching. However advantageous polytetrafluoroethylene insulated wires have shown themselves to be, they have resisted conventional methods of producing the type of splices required for such stringent conditions; and for such environment the proper type of splice is necessary if reliability is to be maintained. Such a splice must have the same hermetic integrity, physical properties and chemical inertness as the original product. The inability of polytetrafluoroethylene insulated wires to splice in a conventional manner is based, of course, on the reluctance of polytetrafluoroethylene to form a good bond with itself or with any other material unless an etching process is employed, which generally alters adversely the chemical inertness and dielectric properties of the polytetrafluoroethylene insulation. Other means have been devised to effect a splice of polytetrafluoroethylene insulated wires which usually involves a sleeve of polytetrafluoroethylene that is positioned around the splice area and held tightly in place by crimping a metal band or wire therearound. The disadvantages of this mechanical stricture approach for accomplishing a splice in polytetrafluoroethylene becomes apparent when the wire is subjected to severe operating conditions with resultant failure of the stricture or cold flowing of the material to permit spark running or leakage. Shrinkable tubing or sleeves have also been employed to facilitate splicing of polytetrafluoroethylene insulated wires but these means are also subject to breakdown during stringent operational environment.

The desideratum then is a method of producing a hermetic seal or a bond sufficiently effective to act as a splice or seal for joining polytetrafluoroethylene materials to provide a joint at least equivalent to the original or parent material with respect to physical and chemical properties. It is the object, therefore, of this invention to provide a method which may be used to seal or bond or splice polytetrafluoroethylene material with itself or other materials in such a manner that a means for producing a hermetic seal thereby is provided. Another object of the present invention is to provide a facile and economic process by which polytetrafluoroethylene insulated wires may be spliced with resultant physical and chemical integrity equivalent to that of the parent insulation. Still another teaching of this invention is to provide a means for splicing coaxial cables having primary and secondary insulation of polytetrafluoroethylene insulation. Other objectives and attendant advantages of the present invention will become apparent when considered in the light of the following detailed description.

The basis of the present invention is the discovery that polytetrafluoroethylene material at about 620° F. develops a semi-plastic state in the extreme fingers of the individual crystals and that a fluorinated ethylene propylene copolymer material, known commercially as Teflon FEP, upon liquefaction under controlled temperature and pressure conditions will penetrate and amalgamate with the crystalline structure of polytetrafluoroethylene to produce an interface having a continuum. That is, the liquid FEP penetrates and locks with the fingers of the polytetrafluoroethylene crystals to produce a mechanical union, thus producing an extremely effective bond and hermetic seal which will withstand pressures of 9000 p.s.i. in liquid solutions without any sign of failure. It is to be noted that physical strength and chemical inertness of the insulation are maintained after such a bond is effected.

The controlled temperature condition necessary to produce proper penetration and amalgamation may be provided by encasing the materials to be joined in a wrapping of metallic foil, such as aluminum foil, and then subjecting the encased assembly to the controlled heat of a heating chamber.

The pressure required particularly for effecting penetration of the fluorinated ethylene propylene into the polytetrafluoroethylene may be induced by external means such as a metallic die, or by tension wrapping one of the materials to be joined onto the other. In connection with the latter method, it has been found that the requisite pressure may be induced by a wrapping of unsintered polytetrafluoroethylene tape which shrinks upon the application of heat. In speaking of unsintered polytetrafluoroethylene, it is to be understood that the polytetrafluoroethylene (Teflon TFE) mentioned earlier is in the sintered or fully cured condition, while unsintered polytetrafluoroethylene is in a condition in which the material is not fully cured. Therefore, in this description when the term polytetrafluoroethylene is used without the adjective "unsintered" immediately preceding it, the term refers to fully cured polytetrafluoroethylene material. Another method for producing the required pressure involves the placement over the joint of a sleeve of expanded polytetrafluoroethylene tubing which also would shrink upon the application of heat.

In the method of the present invention, the polytetrafluoroethylene bodies to be joined are placed in juxtaposition and first wrapped with fluorinated ethylene propylene tape (hereinafter referred to as FEP tape), a second wrapping of unsintered polytetrafluoroethylene tape subsequently being disposed thereover. These wrappings are accomplished with a slight amount of tension such as is easily producible by a light handpull to insure that the pressure required to cause the FEP tape material to penetrate into the crystalline structure of the polytetrafluoroethylene will be produced upon a later application of heat.

The wrapped joint is then enclosed tightly within a foil wrapping which is secured by wiring or other suitable means. Heat is applied to the foil wrapped joint for a predetermined amount of time whereby the polytetrafluoroethylene material is cured and the FEP tape is liquefied, this application of heat being carefully controlled in order to prevent the sublimation or degradation of the polytetrafluoroethylene material and to avoid the generation of harmful gases. Particularly, overheating will cause such undesirable conditions as burning or splitting of the polytetrafluoroethylene wrapping, uncontrollable sublimation, or bubbles in the original polytetrafluoroethylene insulation. Underheating will produce improper sealing due to lack of amalgamation of the FEP tape and polytetrafluoroethylene materials.

As previously mentioned, the pressure required to produce penetration and amalgamation is induced by the shrinking of the unsintered polytetrafluoroethylene tape upon the application of heat. The pressure may also be induced by means of an external die, or as another alternative, the second wrapping of unsintered polytetrafluoroethylene may be replaced by a sleeve of expanded polytetrafluoroethylene which, upon the application of heat, will shrink to produce the required pressure.

By way of example, an electrical conductor insulated with polytetrafluoroethylene material was joined to another similiar conductor by the present method. The conductors were first stripped of their insulation adjacent to the ends to be joined and a conventional mechanical wire splice connection was accomplished. Bare portions of the joined conductors were then wrapped with FEP tape to bring the diameter of the bare portion up to that of the outside diameter of the original insulation, this wrapping also being continued to overlap the original insulation of each of the wires joined. In the next step, the first wrapping of FEP tape was overwrapped with unsintered polytetrafluoroethylene tape, after which the joint was then placed in a foil wrapper that was held tightly thereon by a wire binding. The entire splice assembly was then inserted into the heating aperture of a Thermo-gun Model T–202N76 heating unit which had been preheated to 750° F. Subjection of the wrapped joint to the the heat of the heating unit was accomplished for approximately three minutes after which time cooling air was applied until the splice was cool enough to handle. Upon removal of the wire binding and aluminum foil wrapper, the splice was complete. An alternate method involved, instead of the second wrapping of unsintered polytetrafluoroethylene tape, the placement of an expanded polytetrafluoroethylene sleeve over the wrapping of FEP tape. The wrapped splice was then enclosed in the foil wrapper and subjected to heat as previously described.

A second example in which the method of the present invention was utilized involved the splicing of a coaxial cable having polytetrafluoroethylene insulation. Because the basic construction of coaxial cables involves a centroidal wire or wires, a primary insulation, a braided wire shielding, and an outer protective or secondary insulation, the hermetic splicing thereof has heretofore been extremely difficult or impracticable when such a coaxial cable has as its primary or secondary insulation a material such as polytetrafluoroethylene. However, by use of the present invention, an effective splice was attained, the method comprising the steps of first joining the bared centroidal conductors in a conventional manner and wrapping with FEP tape until the diameter of the bare portion was built up to the diameter of the original primary insulation, the braided wire shield being pulled back away from the splice junction. As before, the FEP tape wrapping is extended to overlap the original polytetrafluoroethylene insulation of each of the wires. A second wrapping of unsintered polytetrafluoroethylene tape was then installed over the FEP wrapping and the entire splice encased tightly in foil and subjected to the heat of a heating unit such as described in connection with Example 1. In this example, however, the heating unit was preheated to 1100° F. and the splice subjected to this temperature for two minutes after which cooling air was applied. The secondary braided conductor was then replaced over the primary insulation and the individual strands thereof positioned to lay parallel to the longitudinal axis of the cable. The braided conductor was then wire-wrapped in proper position and subsequently brazed or soldered and then wrapped with FEP tape to bring the diameter thereof up to the diameter of the secondary or outer insulation. In this case also, the FEP tape was overlapped onto the insulation of each wire. A second wrapping of unsintered polytetrafluoroethylene tape was then placed around the first wrapping and a foil wrapper subsequently placed about the entire splice. The splice was then inserted in the heating aperture of the heating unit which had been preheated to 1100° F. and held in place for six minutes. After application of cooling air, the splice was complete.

In the first two examples, it was seen that a foil wrapping was employed, the function of this foil being to serve as a heat chamber to allow a high temperature heat source to be used for rapid curing by transmitting the heat quickly and rapidly to the splice material without allowing this material to exceed its sublimation temperature. As was stated previously, this avoids degradation of the material and prevents any generation of harmful gases.

In a third example of the use of the present invention, two pieces of polytetrafluoroethylene were placed in contact with an intermediate layer of FEP material. The resulting assembly was then placed in a heated die at about 750° F. and subjected to pressures of the order of 0.5 p.s.i. for about one minute. Upon cooling and removal of the assembly from the die, it was found that an effective bond having extremely high hermetic integrity had been accomplished.

A fourth example of the use of the present invention involved the making of a T-splice in which the polytetrafluoroethylene insulation had been stripped away from the joint in a conventional manner. The exposed portions of the joined conductors were wrapped with FEP tape until the diameter thereof was essentially the same as the diameter of the original insulation, the tape also being overlapped onto the original insulation. A sheet of polytetrafluoroethylene was then folded over the wrapped portion and secured thereto by means of stapling the edges of the sheet together. The entire assembly was then placed in an appropriate die which had been preheated to 750° F. and contact maintained for approximately 30–75 seconds after which time the cured splice was removed and the excess material trimmed away.

Another example of use of the instant invention is embodied in a method for joining pieces of polytetrafluoroethylene pipes. This method comprises positioning the ends of the pipes in abutment, wrapping a layer of FEP tape around the pipes adjacent to the ends to be joined, wrapping a second layer of unsintered polytetrafluoroethylene tape over the first layer of FEP tape, then wrapping the second layer with metallic foil as previously described and lastly, applying heat in the same manner as in the first two examples, i.e., 750° F. for approximately 3 minutes.

Obviously many modifications and variations of the present invention are possible in the light of the above teachings. It is to be understood therefore that the invention may be practiced within the scope of the appended claims otherwise than as specifically described.

What is claimed is:

1. A method of bonding first and second pieces of polytetrafluoroethylene comprising the steps of:
   placing said first and second pieces in juxtaposition to form a junction;
   wrapping a first layer of fluorinated ethylene propylene material around said pieces of polytetrafluoroethylene in the vicinity of said junction;
   wrapping a second layer of unsintered polytetrafluoroethylene material around said first layer;
   wrapping a third layer of metallic foil around said second layer; and
   applying heat under controlled conditions to bond said first layer to said pieces of polytetrafluoroethylene and to said second layer, and to cause said second layer to shrink.

2. The method as recited in claim 1 wherein said heat applied is in the order of 750° F. for a period of about 2 to 5 minutes.

3. A method of bonding first and second pieces of polytetrafluoroethylene comprising the steps of:
   placing said first and second pieces in juxtaposition to form a junction;

wrapping a first layer of fluorinated ethylene propylene material around said pieces of polytetrafluoroethylene in the vicinity of said junction;

wrapping a second layer of unsintered polytetrafluoroethylene around said first layer;

wrapping a third layer of metallic foil around said second layer; and applying sufficient heat to cause said pieces and second layer of polytetrafluoroethylene to develop a semiplastic state in the outer fingers of their crystalline structures and to cause said second layer of unsintered polytetrafluoroethylene to shrink to produce sufficient pressure to cause said fluorinated ethylene propylene material to penetrate and lock with the fingers of the crystalline structure of said first and second pieces and said second layer of polytetrafluoroethylene.

4. The method of splicing at least two polytetrafluoroethylene insulated electrical wires comprising the steps of cutting away the polytetrafluoroethylene insulation adjacent the ends of the wire to be spliced to bare the conductors, joining the conductors in locked relationship, wrapping the joined conductors with fluorinated ethylene propylene tape until the diameter thereof is approximately the same as the outside diameter of the original polytetrafluoroethylene insulation, overlapping the fluorinated ethylene propylene tape wrapping onto the original polytetrafluoroethylene insulation of each of the wires to be joined, placing a subsequent wrapping of unsintered polytetrafluoroethylene tape on the fluorinated ethylene propylene tape wrapping, placing and securing a foil wrapping over the subsequent wrapping of polytetrafluoroethylene tape, exposing the foil and its wrapped contents to heat of approximately 750° F. for approximately three minutes, and cooling the foil and its contents.

5. A method of coupling a first piece of polytetrafluoroethylene pipe to a second piece of polytetrafluoroethylene pipe comprising the steps of positioning the ends of said pipe to be joined in juxtaposition, installing a continuous wrapping of fluorinated ethylene propylene tape around said pipes adjacent to the ends thereof to be coupled, installing a continuous wrapping of unsintered polytetrafluoroethylene tape over said wrapping of fluorinated ethylene propylene tape, enclosing tightly said wrapping of polytetrafluoroethylene tape in a metallic foil, and applying heat to said foil.

6. The method as recited in claim 5 wherein said heat applied is in the order of 750° F. for approximately three minutes.

References Cited

UNITED STATES PATENTS 2,768,105  10/1956  Dittmore et al. _____ 156—49
2,993,820  7/1961  Marshall _____ 156—86 X

FOREIGN PATENTS 548,988  11/1957  Canada.

OTHER REFERENCES

Fluorocarbons, in Modern Plastics, pp. 83–87 and 170–176, December 1952.

EARL M. BERGERT, *Primary Examiner.*

W. F. ZAGURSKI, J. F. MATHEWS, T. R. SAVOIE, *Assistant Examiners.*